UNITED STATES PATENT OFFICE.

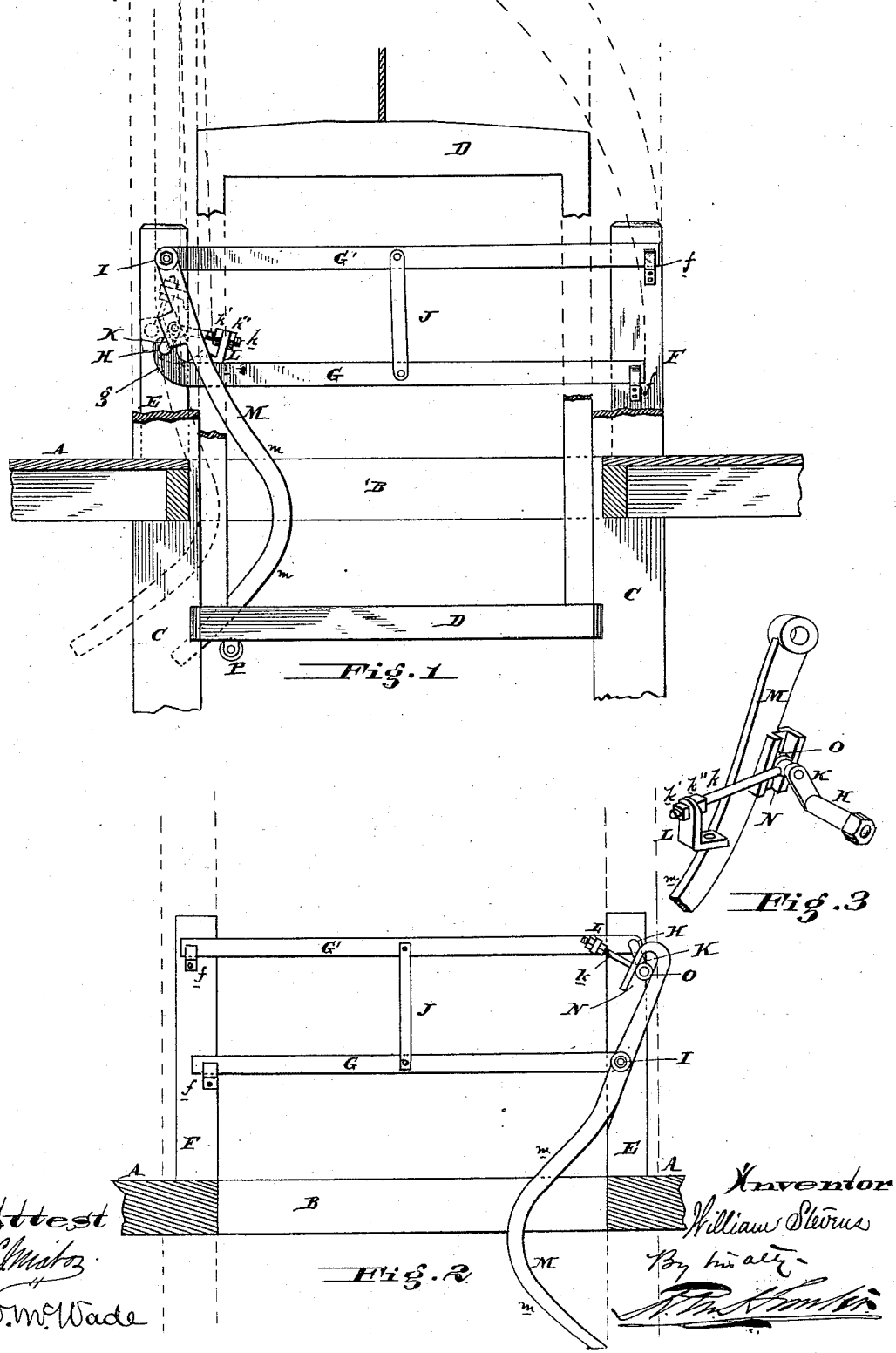

WILLIAM STEVENS, OF PHILADELPHIA, PENNSYLVANIA.

HATCH-GATE FOR ELEVATORS.

SPECIFICATION forming part of Letters Patent No. 279,611, dated June 19, 1883.

Application filed March 23, 1883. (No model.)

*To all whom it may concern:*

Be it known that I, WILLIAM STEVENS, of the city of Philadelphia, county of Philadelphia, and State of Pennsylvania, have invented an Improvement in Hatch-Gates for Elevators, of which the following is a specification.

My invention has reference to elevators, but more particularly to the automatic gates adapted to open and close upon the passage of the platform or cage, and remain open if said cage be brought to rest before a floor; and it consists in combining the hinged gates with a curved swinging arm or lever arranged to be vibrated by the cage in passing up and down the guide-posts, and so connected with said gates that they are swung up out of the way to allow free passage to the cage, and in details of construction, all of which is fully set forth in the following specification and shown in the accompanying drawings, which form part thereof.

The object of my invention is to provide suitable simple, cheap, and effective means by which said hinged gates may be worked without danger of disarrangement or rapid wear.

In the drawings, Figure 1 is a sectional elevation of an elevator with part of the cage and guide-posts broken away. Fig. 2 is a sectional elevation of a modified form of apparatus to open and close the gates automatically. Fig. 3 is a perspective view of some of the details of construction.

A is the floor. B is the hatchway, and C are the vertical guide-posts. D is the elevator-cage. E and F are supports for the gate.

The gate consists of the two parallel bars, G G', pivoted to post E at H and I, and connected together at or near their middle by a link, J. The free ends of bars G G' are supported by brackets *f* on post F when the gate is closed. Pivoted at I is the swinging arm or lever M, which is provided at its lower or free end with two curved or cam parts *m*, and near its pivoted end with a guideway, N, in which a roller, O, works, the said roller being pivoted to the end of crank-arm K, whose center is H, the pivotal point of bar G. This crank K is made fast to said bar G by a link, *k*, which has its other end made adjustable in a bracket, L, secured to said bar G by nuts *k' k''*.

It is evident that the crank K may be made integral with bar G; but I prefer to make it as shown to allow of adjustment. To enable said bars G G' to open fully and more readily close, I prefer to curve the end of bar G, as shown at *g*, as this will allow me to place the pivotal points I and H directly above each other. The cage D is provided with a roller, P, which strikes the cams *m* of lever M and causes it to vibrate at the right time to open or close said gate.

In place of pivoting the lever M at the pivotal point of the upper bar, G', it may be pivoted at the pivotal point of the lower bar, G, as shown in Fig. 2, the only difference being to change the order of the lever and direction of the crank K.

I do not limit myself to the exact construction shown, as it may be modified in various ways without departing from my invention.

Having now described my invention, what I claim as new, and desire to secure by Letters Patent, is—

1. An elevator-hatchway provided with a hinged gate, in combination with a crank on said gate, a swinging cam-lever arranged to actuate said crank, and thereby adapted to open or close said gate, and an elevator cage or platform provided with means to vibrate said lever during its passage up or down, substantially as and for the purpose specified.

2. An elevator-hatchway provided with a hinged gate, in combination with a swinging cam-lever adapted to open or close said gate, and an elevator cage or platform provided with means to vibrate said lever during its passage up or down, and means to adjust the degree of opening of said gate, substantially as and for the purpose specified.

3. An elevator-hatchway provided with a hinged gate composed of parallel bars hinged together and provided with a crank, in combination with a swinging cam-lever adapted to open or close said gate, and an elevator cage or platform provided with means to vibrate said lever during its passage up or down, substantially as and for the purpose specified.

4. The combination of hatchway B, a hinged gate, pivoted lever M, having cam-surfaces *m*, connecting mechanism, and cage D, having a roller, P, substantially as and for the purpose specified.

5. The combination of hatchway B, a gate formed of bars G G′ and link J, crank K, rod or link k, bracket L, nuts k′ k″, lever M, having guideway N and cam-surfaces m, and platform or cage D, having a roller, P, substantially as and for the purpose specified.

6. The combination of hatchway B, a gate formed of bars G G′, the lower of which is curved on its pivoted end, as at g, link J, crank K, rod or link k, bracket L, nuts k′ k″, lever M, having guideway N and cam-surfaces m, and platform or cage D, having a roller, P, substantially as and for the purpose specified.

In testimony of which invention I hereunto set my hand.

WILLIAM STEVENS.

Witnesses:
R. M. HUNTER,
WM. MCWADE.